United States Patent
Clark et al.

(10) Patent No.: US 10,431,102 B2
(45) Date of Patent: Oct. 1, 2019

(54) FLIGHT RANGE-RESTRICTING SYSTEMS AND METHODS FOR UNMANNED AERIAL VEHICLES

(71) Applicant: THE BOEING COMPANY, Chicago, IL (US)

(72) Inventors: Jason W. Clark, Evergreen, CO (US); Andres Chapiro Fermon, Boulder, CO (US); Matthew Robert Price, Wawaka, IN (US); Jonas Hatzenbuehler, Rheinland-Pflaz (DE)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 15/347,239

(22) Filed: Nov. 9, 2016

(65) Prior Publication Data

US 2018/0130359 A1 May 10, 2018

(51) Int. Cl.
| | |
|---|---|
| *G06F 16/22* | (2019.01) |
| *H04W 4/80* | (2018.01) |
| *B64C 39/02* | (2006.01) |
| *G08G 5/00* | (2006.01) |

(Continued)

(52) U.S. Cl.
CPC ............ *G08G 5/006* (2013.01); *B64C 39/024* (2013.01); *G05D 1/0011* (2013.01); *G05D 1/101* (2013.01); *G06F 16/22* (2019.01); *G08G 5/0013* (2013.01); *G08G 5/0026* (2013.01);

(Continued)

(58) Field of Classification Search
CPC ....... G08G 5/006; G08G 5/0069; H04W 4/80; B64C 39/024; B64C 2201/146; G06F 17/30312; G05D 1/0011
See application file for complete search history.

(56) References Cited

U.S. PATENT DOCUMENTS

| | | | |
|---|---|---|---|
| 2009/0207048 A1* | 8/2009 | He | G01C 23/00 340/973 |
| 2014/0018979 A1* | 1/2014 | Goossen | G08G 5/0034 701/3 |

(Continued)

FOREIGN PATENT DOCUMENTS

| | | |
|---|---|---|
| EP | 2685336 | 1/2014 |
| WO | WO 2016/130994 | 8/2016 |
| WO | WO 2016/154941 | 10/2016 |

OTHER PUBLICATIONS

Extended European Search Report for EP 17191746.1-1204/3327531, dated May 24, 2018.

*Primary Examiner* — Rodney A Butler
(74) *Attorney, Agent, or Firm* — Joseph M. Butscher; The Small Patent Law Group, LLC

(57) ABSTRACT

A flight range-restricting system is configured to control a flight range of an unmanned aerial vehicle (UAV). The flight range-restricting system includes a database including a UAV capabilities storage area that stores UAV capabilities data indicative of technical specifications of the UAV, and a restricted airspace storage area that stores restricted airspace data indicative of a restricted airspace. A range-restricting control unit is communicatively coupled to the database. The range-restricting control unit controls the flight range of the UAV based on a current location of the UAV, the UAV capabilities data, and the restricted airspace data.

20 Claims, 4 Drawing Sheets

(51) Int. Cl.
*G05D 1/10* (2006.01)
*G05D 1/00* (2006.01)

(52) U.S. Cl.
CPC .......... *G08G 5/0069* (2013.01); *H04W 4/80* (2018.02); *B64C 2201/027* (2013.01); *B64C 2201/146* (2013.01)

(56) References Cited

U.S. PATENT DOCUMENTS

| | | | |
|---|---|---|---|
| 2014/0249738 A1* | 9/2014 | Euteneuer | G01S 13/9303 |
| | | | 701/301 |
| 2017/0108866 A1* | 4/2017 | Quinn | G05D 1/0088 |
| 2018/0084316 A1* | 3/2018 | Kugelmass | H04Q 9/00 |
| 2018/0120836 A1* | 5/2018 | Hardee | G05D 1/0055 |

* cited by examiner

FLIGHT RANGE-RESTRICTING SYSTEMS AND METHODS FOR UNMANNED AERIAL VEHICLES

FIELD OF THE DISCLOSURE

Embodiments of the present disclosure generally relate to systems and methods for restricting a flight range of an unmanned aerial vehicle.

BACKGROUND OF THE DISCLOSURE

In recent years, unmanned aerial vehicles (UAVs), such as aerial drones, have become available for commercial and private use. For example, certain businesses have started, or have considered, using aerial drones to deliver products to customers. An individual may order a product from a particular provider, and an aerial drone may deliver the product to the home of the individual. As such, delivery of goods to consumers is becoming quicker and more efficient due to the use of aerial drones.

Drones may also be used for non-commercial purposes. For example, drones may be used with respect to aerial photography.

Airspace above and surrounding various locations may be restricted for a variety of reasons. For example, an airspace surrounding an airport may be restricted to ensure safe departures and arrivals at the airport. As another example, a no fly zone may be established with respect to various events (such as national sporting events, political rallies, and/or the like).

Operators of UAVs are not typically required to have current aviation maps and/or be completely familiar with aviation charts. As such, they may be unaware of certain types of airspace restrictions, such as temporary flight restrictions (which may be in place during a political rally or campaign stop, for example).

As can be appreciated, an individual may attempt to fly a UAV into a restricted airspace. Accordingly, at least some UAV manufacturers issue advisories with particular UAVs that indicate locations where flight is restricted. However, such advisories may be ignored by an owner of a UAV. Moreover, to the extent that certain UAVs may be programmed to avoid various restricted airspaces, certain individuals are often able to override such programming and fly the UAVs into a restricted airspace.

SUMMARY OF THE DISCLOSURE

A need exists for a system and method for preventing a UAV from flying into and within a restricted airspace without authorization. A need exists for a system and method of restricting flight of a UAV with respect to a restricted airspace.

With those needs in mind, certain embodiments of the present disclosure provide a flight range-restricting system that is configured to control a flight range of an unmanned aerial vehicle (UAV). The flight range-restricting system includes a database having a UAV capabilities storage area that stores UAV capabilities data indicative of technical specifications of the UAV, and a restricted airspace storage area that stores restricted airspace data indicative of restricted airspace. A range-restricting control unit is communicatively coupled to the database. The range-restricting control unit controls the flight range of the UAV based on a current location of the UAV, the UAV capabilities data, and the restricted airspace data.

The range-restricting control unit receives a position signal indicative of the current location of the UAV. The position signal may be output by a position determination device onboard the UAV. Optionally, or additionally, the position signal may be output by a position determination device of a remote UAV control device that controls operation of the UAV.

The range-restricting control unit restricts operation of the UAV when the UAV is proximate to or within the restricted airspace. For example, the range-restricting control unit may restrict operation of the UAV by preventing the UAV from being flown when the UAV is proximate to or within the restricted airspace.

In at least one embodiment, the range-restricting control unit determines a range circle of the UAV. The range-restricting control unit restricts operation of the UAV when the range circle interferes with the restricted airspace. The range circle may be centered about a current location of the UAV. Optionally, the range circle may be centered about a current location of a remote UAV control device that controls operation of the UAV.

The range-restricting control unit may allow for operation of the UAV at a reduced range when the UAV is outside of the restricted airspace and at least a portion of the range circle is within the restricted airspace.

Certain embodiments of the present disclosure provide a flight range-restricting method that controls a flight range of an unmanned aerial vehicle (UAV). The flight range-restricting method includes storing capabilities data indicative of technical specifications of the UAV within a UAV capabilities storage area of a database, storing restricted airspace data indicative of a restricted airspace within a restricted airspace storage area of the database, communicatively coupling a range-restricting control unit to the database, analyzing (using a range-restricting control unit) a current location of the UAV, the UAV capabilities data, and the restricted airspace data, and controlling (using the range-restricting control unit) the flight range of the UAV based on the analyzing.

Certain embodiments of the present disclosure provide a flight control system that includes an unmanned aerial vehicle (UAV), and a remote UAV control device in communication with the UAV. The remote UAV controls operation of the UAV. One or both of the UAV and the remote UAV control device includes a position determination device that outputs a position signal indicative of a current location of the UAV. A flight range-restricting system is configured to control a flight range the UAV.

DETAILED DESCRIPTION OF THE DISCLOSURE

Figure 1:
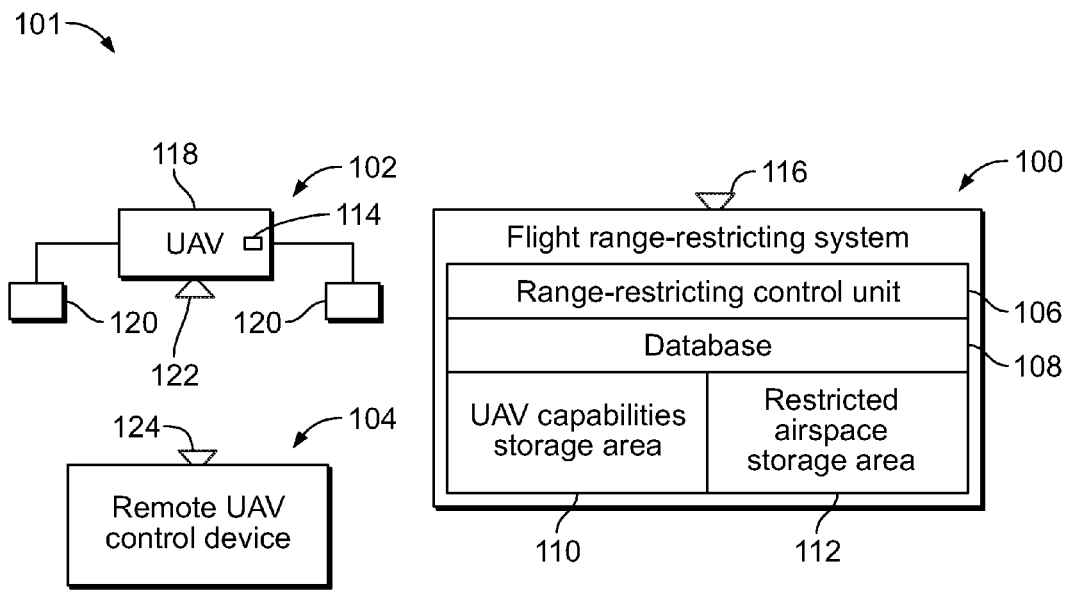
FIG. 1 is a schematic block diagram of a flight range-restricting system in relation to an unmanned aerial vehicle (UAV) and a remote UAV control device, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide flight range-restricting systems and methods for unmanned aerial vehicles (UAVs). The systems and methods may be configured to provide a virtual geo-fence (for example, a range circle) around a UAV that is used to prevent access into controlled or restricted airspace without permission. In at least one embodiment, the UAV may include a specifications identifier that provides technical specifications of the UAV. The specifications identifier may be in the form of a near field communication (NFC) tag, for example. In at least one other embodiment, the specifications identifier may be provide communications from the UAV via Bluetooth, radio frequency signals, and/or the like.

A remote UAV control device is communicatively coupled to the UAV and is configured to control operation of the UAV. In at least one embodiment, the remote UAV control device is a handheld smart device, such as a smart phone, tablet, or the like. In at least one other embodiment, the remote UAV control device may be a dedicated control device that is specifically designed to control the UAV.

Technical specifications (such as velocity capability, flight time capability, and the like) may be used determine a range of the UAV. The technical specifications of the UAV may be compared with airspace restrictions. If the UAV range interferes with controlled or restricted airspace, the flight of the UAV is restricted. For example, the UAV may be prevented from taking off.

In at least one embodiment, a flight range-restricting system generates a virtual range circle around a UAV. The virtual range circle represents a range of the UAV. While the term range circle it used, it is to be understood that the range circle may not be a perfect circle. For example, depending on wind speed and direction, the shape of range circle may change (such as an elliptical shape, an oblong shape, or the like). For example, after purchase of the UAV, a user may scan a specifications identifier (such as an NFC tag or QR code) to import the UAV specifications into the flight range-restricting system. A maximum range of the UAV may then be determined. The maximum range is determined as a range radius of the UAV. If the UAV does not have an onboard GPS unit, a remote control device (such as a handheld smart phone) that is used to control the UAV provides a center point for the range. A range circle is then drawn around the center point with the pre-established range radius. If the range circle interferes (that is, extends into, abuts against, or the like) with controlled or restricted airspace, a flight of the UAV is restricted (for example, the UAV may be prevented from taking off). If there is no interference, the UAV is allowed to be operated in a normal fashion. Every time that the remote control device moves more than a specified distance, the calculation is repeated. If there is any interference, the UAV may remain in a hover state until the smart device returns to an acceptable position.

As another example, the UAV may include a position determination device, such as an on-board GPS unit. In this embodiment, the range center point is determined by the location of the UAV, instead of the location of the remote control device.

FIG. 1 is a schematic block diagram of a flight range-restricting system 100 in relation to an unmanned aerial vehicle (UAV) 102 and a remote UAV control device 104, according to an embodiment of the present disclosure. FIG. 1 shows a flight control system 101 that includes the flight-restricting system 100, the UAV 102, and the remote UAV control device 104. The flight range-restricting system 100 includes a range-restricting control unit 106 communicatively coupled to a database 108, such as through one or more wired or wireless connections. In at least one embodiment, the database 108 may be part of the range-restricting control unit 106.

The database 108 includes a UAV capabilities storage area 110 and a restricted airspace storage area 112. The UAV capabilities storage area 110 stores capabilities data for the UAV 102. For example, the UAV capabilities storage area 110 may store a maximum velocity of the UAV, a maximum flight time of the UAV (based on a battery charge, full fuel tank, etc.), and/or the like. The capabilities data for the UAV 102 may be downloaded and stored within the UAV capabilities storage area 110. For example, an individual may download the capabilities data for the UAV 102 from a website of a manufacturer of the UAV 102.

In at least one other embodiment, the UAV 102 may include a specifications identifier 114 that includes the capabilities data for the UAV 102. The specifications identifier 114 may be in the form of a tag, such as a near field communications (NFC) tag, a Bluetooth-enabled tag, an RFID tag, and/or the like. The capabilities data stored on the specifications identifier 114 may be wirelessly communicated to the UAV capabilities storage area 110 and stored therein, such as after an individual purchases the UAV 102. In such an embodiment, the individual may scan the specifications identifier 114, such as with a smart device, at which point the capabilities data stored within the specification identifier 114 is output to the flight range-restricting system 100, which may receive the capabilities data via a communication device 116, such as an antenna, transceiver, Internet connection, and/or the like. In at least one other embodiment, the UAV 102 may not include the specifications identifier 114.

The restricted airspace storage area 112 stores restricted airspace data. The restricted airspace data may be output by various authorities (such as airports, public or private lands, and/or the like). The restricted airspace data is received by the flight range-restricting system 100, such as via the communication device 116, and stored within the restricted airspace storage area 112.

The UAV 102 includes an airframe 118 coupled to at least one propulsion system 120. The UAV 102 also includes a communication device 122, such as an antenna, transceiver, and/or the like, that allows the UAV to be in communication with the remote UAV control device 104 and/or the flight range-restricting system 100. The propulsion system 120 may include one or more propellers, rotors, and/or the like. In at least one embodiment, the propulsion system 120 is configured to propel the UAV 102 akin to a helicopter. In at least one other embodiment, the propulsion system 120 is configured to propel the UAV 102 akin to an airplane.

The remote UAV control device 104 includes a communication device 124 that communicatively couples the remote UAV control device 104 the UAV 102 and the flight range-restricting system 100. In at least one embodiment, the remote UAV control device 104 is a handheld smart device, such as a smart phone or tablet. In at least one other embodiment, the remote UAV control device 104 is a dedicated control device that is specifically designed to control operation of the UAV 102.

As shown, the flight range-restricting system 100 may be separate, distinct, and remote from the remote UAV control device 104. For example, the flight range-restricting system 100 may be located at a first location that is separate and distinct from the remote UAV control device 104. The remote UAV control device 104 and the flight range-restricting system 100 may wirelessly communicate with one other, such as via the communication device 116 and 124. In at least one embodiment, the remote UAV control device 104 may communicate with the flight range-restricting system 100 through a mutual Internet connection. In at least one other embodiment, the flight range-restricting system 100 is housed within the remote UAV control device 104.

In operation, the flight range-restricting system 100 stores the capabilities data of the UAV in the UAV capabilities storage area 110 of the database 108. The flight range-restricting system 100 also stores restricted airspace data within the restricted airspace storage area 112. The range-restricting control unit 106 analyzes the current location of the UAV 102, the capabilities data, and the restricted airspace data to determine whether a flight of the UAV 102 is to be restricted.

In at least one embodiment, the range-restricting control unit 106 determines a current location of the UAV 102 and generates a range circle around the current location of the UAV. The generated range circle may be based on the current location of the UAV, a current velocity of the UAV, a maximum velocity of the UAV, a current heading of the UAV, and/or the like. In short the range circle may be based on a current vector of the UAV 102, along with a maximum velocity of the UAV 102. The range-restricting control unit 106 continually monitors the current location of the UAV 102 and updates the range circle thereof.

When the range-restricting control unit 106 determines that the range circle of the UAV 102 does not interfere (for example, overlap, intersect, abut into, and/or the like) a restricted airspace (as determined from the restricted airspace data stored in the restricted airspace storage area 112), the range-restricting control unit 106 allows the UAV 102 to be operated in a normal fashion. That is, the range-restricting control unit 106 does not further restrict the range of the UAV 102 beyond the capabilities data of the UAV 102 stored in the UAV capabilities storage area 110.

If, however, the range-restricting control unit 106 determines that the range circle of the UAV 102 interferes with the restricted airspace, the range-restricting control unit 106 prevents the UAV 102 from taking off. For example, the range-restricting control unit 106 may output a flight prevention signal to the remote UAV control device 104 that prevents the remote UAV control device 104 from allowing the UAV to fly.

If the UAV 102 is already in flight when the range circle interferes with the restricted airspace, the range-restricting control unit 106 may output an alert signal to the remote UAV control device 104 indicating that the UAV 102 is to be immediately maneuvered out of the restricted airspace. In at least one other embodiment, when the UAV 102 is already flying and interferes with the restricted airspace, the range-restricting control unit 106 may output an override control signal (either to the remote UAV control device 104 or directly to the UAV 102) which temporarily controls the UAV 102, and maneuvers the UAV 102 out of the restricted airspace.

In at least one embodiment, while the range circle may interfere with the restricted airspace, the UAV 102 may be positioned outside of the restricted airspace. As such, the range-restricting control unit 106 may allow the UAV 102 to be operated so long as the actual position of the UAV 102 is outside of the restricted airspace. The range-restricting control unit 106 may restrict a speed and direction of the UAV 102 during such time as the range circle interferes with the restricted airspace, but the actual position of the UAV 102 is outside of the restricted airspace. For example, the range-restricting control unit 106 may establish a buffer zone within the range circle into which the UAV 102 is prevented from flying.

In at least one embodiment, the range circle is centered about a current location of the UAV 102 itself. In such an embodiment, the UAV 102 includes a position determination device (such as a GPS unit) that outputs a position signal that is received by the flight range-restricting system 100. The range restricting control unit 106 receives the position signal from the UAV 102 and determines the current location of the UAV 102 based on the received position signal. In at least one other embodiment, the position signal may be received by the remote UAV control device 104, which transmits the position signal of the UAV 102 to the flight range-restricting system 100.

In at least one other embodiment, the UAV 102 may not include a position determination device. In this embodiment, the remote UAV control device 104 may include a position determination device. The range-restricting control unit 106 may generate the range circle based on the current location of the remote UAV control device 104, which provides an indication of the location of the UAV 102 itself. For example, based on the capabilities data of the UAV 102 stored in the UAV capabilities storage area 110, the range-restricting control unit 106 may determine a maximum radial distance of the UAV 102 from the position of the remote UAV control device 104. The maximum radial distance provides a radius of the range circle that is centered about the current location of the remote UAV control device 104.

In at least one other embodiment, neither the UAV 102, nor the remote UAV control device 104 may include a position determination device. In such an embodiment, a distance between the remote UAV control device 104 and the UAV 102 is determined through a communication connection therebetween, such as a Bluetooth or other such wireless connection. The flight range-restricting system 100 may restrict the range of the UAV 102 based on the distance between the UAV 102 and the remote UAV control device 104.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the range-restricting control unit 106 may be or include one or more processors that are configured to control operation of the flight range-restricting system 100.

The range-restricting control unit 106 is configured to execute a set of instructions that are stored in one or more storage elements (such as one or more memories), in order to process data. For example, the range-restricting control unit 106 may include or be coupled to one or more memories. The storage elements may also store data or other information as desired or needed. The storage elements may be in the form of an information source or a physical memory element within a processing machine.

The set of instructions may include various commands that instruct the range-restricting control unit 106 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the range-restricting control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, EPROM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the range-restricting control unit 106 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, OTP (one time programmable) memory, and non-volatile RAM (NVRAM) memory. The above memory types are exemplary only, and are thus not limiting as to the types of memory usable for storage of a computer program.

Figure 2:
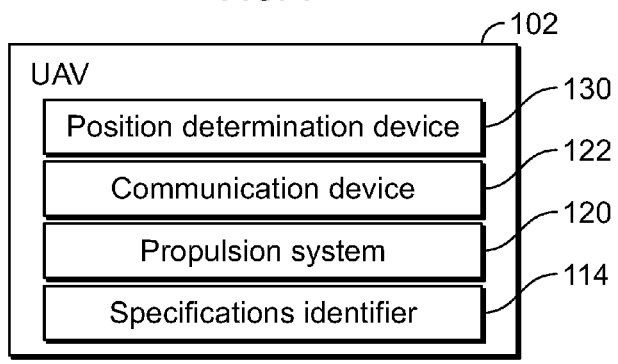
FIG. 2 is a schematic block diagram of a UAV, according to an embodiment of the present disclosure.

FIG. 2 is a schematic block diagram of the UAV 102, according to an embodiment of the present disclosure. The UAV 102 includes the propulsion system(s) 120 and the communication device 122, as described above. The UAV 102 may also include the specifications identifier 114. Optionally, the UAV 102 may not include the specification identifier 114.

The UAV 102 may also include a position determination device 130, such as a GPS unit, a position triangulation unit, and/or the like. The position determination device 130 determines a current location of the UAV 102 and outputs a position signal, which may then be received by the remote UAV control device 104 and/or the flight range-restricting system 100 (shown in FIG. 1). As described above, the range circle determined by the range-restricting control unit 106 may be based on the actual current location of the UAV 102, such as output by position signal. Optionally, the UAV 102 may not include the position determination device 130.

Figure 3:
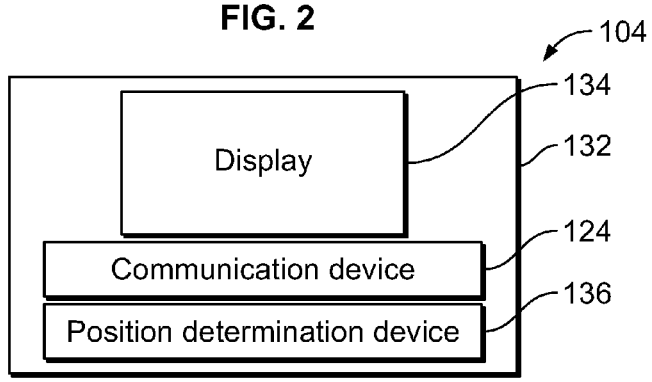
FIG. 3 is a schematic block diagram of a remote UAV control device, according to an embodiment of the present disclosure.

FIG. 3 is a schematic block diagram of the remote UAV control device 104, according to an embodiment of the present disclosure. As shown in FIG. 3, the remote UAV control device 104 is a handheld smart device, such as a smart phone or tablet, having a handheld housing 132. The communication device 124 may be within the housing 132. A display 134, such as a touchscreen display, is coupled to the housing 132.

The remote UAV control device 104 may also include a position determination device 136, such as a GPS unit, a position triangulation unit, and/or the like. As described above with respect to FIG. 1, the range circle of the UAV 102 may be determined based on the actual location of the remote UAV control device 104. For example, based on the maximum range of the UAV 102 as stored in the UAV capabilities storage area 110, a radius representing the maximum range may be extended from the current location of the remote UAV control device 104, as output by a position signal from the position determination device 136. The radius is then swept around the location of the remote UAV control device 104 to form the range circle. The current location of the remote UAV control device 104 forms the center of the range circle.

Figure 4:
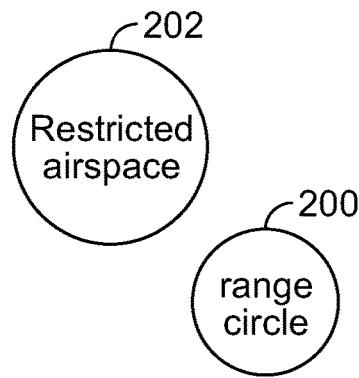
FIG. 4 is a schematic diagram of a range circle outside of a restricted airspace, according to an embodiment of the present disclosure.

FIG. 4 is a schematic diagram of a range circle 200 outside of a restricted airspace 202, according to an embodiment of the present disclosure. Referring to FIGS. 1 and 4, the range-restricting control unit 106 determines the range circle 200 based on the current location of the UAV 102 (as determined from a position signal output by the UAV 102 and/or through a position signal output by the remote UAV control device 104), and the capabilities data of the UAV 102 stored in the UAV capabilities storage area 110. As shown in FIG. 4, the range circle 200 of the UAV 102 does not interfere with the restricted airspace 202. Accordingly, the range-restricting control unit 106 allows the UAV 102 to be operated normally. That is, the range-restricting control unit 106 does not restrict operation of the UAV 102, so long as the range circle 200 is outside of the restricted airspace 202. If, however, the range circle 200 interferes with the restricted airspace 202, the range-restricting control unit 106 restricts operation of the UAV 102.

Figure 5:
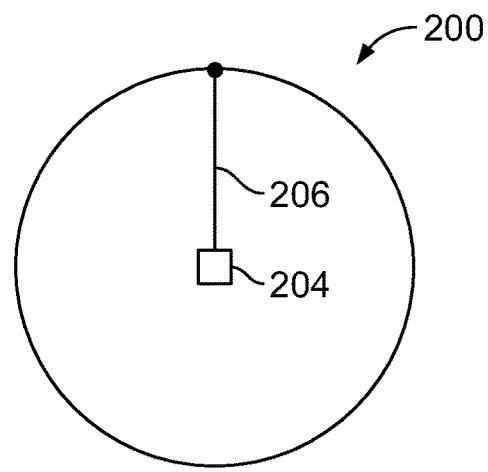
FIG. 5 is a schematic diagram of a range circle of a UAV, according to an embodiment of the present disclosure.

FIG. 5 is a schematic diagram of the range circle 200 of the UAV 102 (shown in FIG. 1), according to an embodiment of the present disclosure. Referring to FIGS. 1 and 5, in this embodiment, the range circle 200 is determined based on an actual location 204 of the remote UAV control device 104. Based on the capabilities data of the UAV 102 stored in the UAV capabilities storage area 110, the range-restricting control unit 106 projects a radius 206 from the current location 204 of the remote UAV control device 104. The radius 206 represents a maximum range of the UAV 102 from the current location 204 of the remote UAV control device 104. The range-restricting control unit 106 sweeps the radius 206 about the current location 204 to form the range circle 200. The range-restricting control unit 106 may continually update the range circle 200 based on the current location 204 of the remote UAV control device 104.

Optionally, as described above, the range circle 200 may be centered about a current location of the UAV 102. For example, if the UAV 102 includes a position determination device, the range circle 200 may be centered about the current location of the UAV 102.

Figure 6:
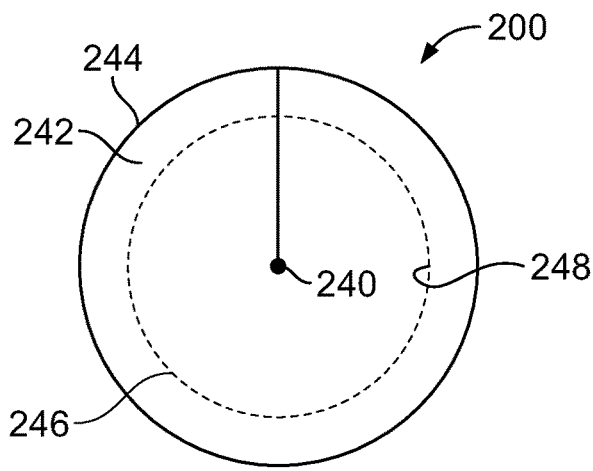
FIG. 6 is a schematic diagram of a range circle of a UAV, according to an embodiment of the present disclosure.

FIG. 6 is a schematic diagram of the range circle 200 of the UAV 102 (shown in FIG. 1), according to an embodiment of the present disclosure. Referring to FIGS. 1 and 6, a center 240 of the range circle 200 may be determined by a current location of the UAV 102 and/or a current location of the remote UAV control device 104, as described above.

When the range circle 200 interferes with the restricted airspace 202 (shown in FIG. 4), the range-restricting control unit 106 determines whether the UAV 102 is within the restricted airspace 202 or not. If the UAV 102 is not within the restricted airspace 202 (but the range circle 200 has at least a portion that interferes with the restricted airspace 202), the range-restricting control unit 106 may generate a buffer zone 242 between an outer limit 244 of the range circle 200 and an outer portion 246 of an operational interior circle 248. The range-restricting control unit 106 may allow the UAV 102 to be operated normally (or at diminished capability) within the operational interior circle 248. However, operation of the UAV 102 may be restricted or prevented within the buffer zone 242. The size and shape of the buffer zone 242 may be continually updated, and may shrink or expand based on a current vector of the UAV 102.

Figure 7:
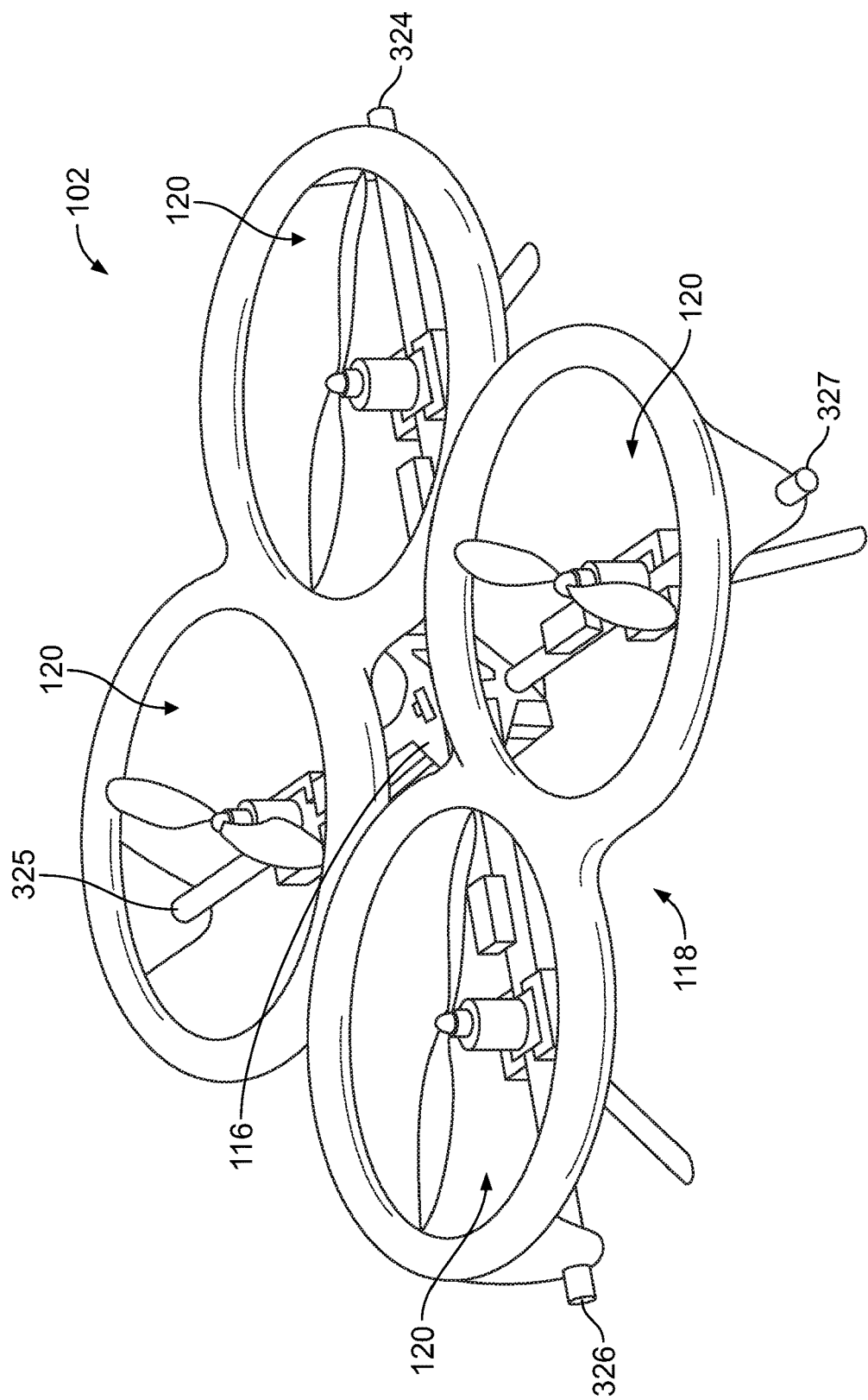
FIG. 7 is a diagrammatic representation of a top view of an example of an unmanned aerial vehicle, according to an embodiment of the present disclosure.

FIG. 7 is a diagrammatic representation of a top view of an example of a UAV 102 according to an embodiment of the present disclosure. As shown in FIG. 7, the UAV 102 may include an airframe 118 and a plurality of propulsion systems 120 coupled to the airframe 118. In general, the airframe 118 forms the structural body or framework for the UAV 102. In the illustrated embodiment shown in FIG. 7, the UAV 102 includes four propulsion systems 120, such that each propulsion system 120 is mounted to a respective arm 324, 325, 326, and 327. In the illustrated embodiment, the UAV 102 includes four arms 324-327 and a single propulsion system 120 that is mounted to each respective arm 324-327. Optionally, the UAV 102 may include more or less propulsion systems 120, more or less propulsion systems 120 per arm 324-327, and more or less arms 324-327 than shown.

Also, optionally, instead of the UAV shown in FIG. 7, the UAV 102 may be include a fuselage, wings, a tail, and the like. In this manner, the UAV 102 may be designed as an unmanned airplane.

Figure 8:
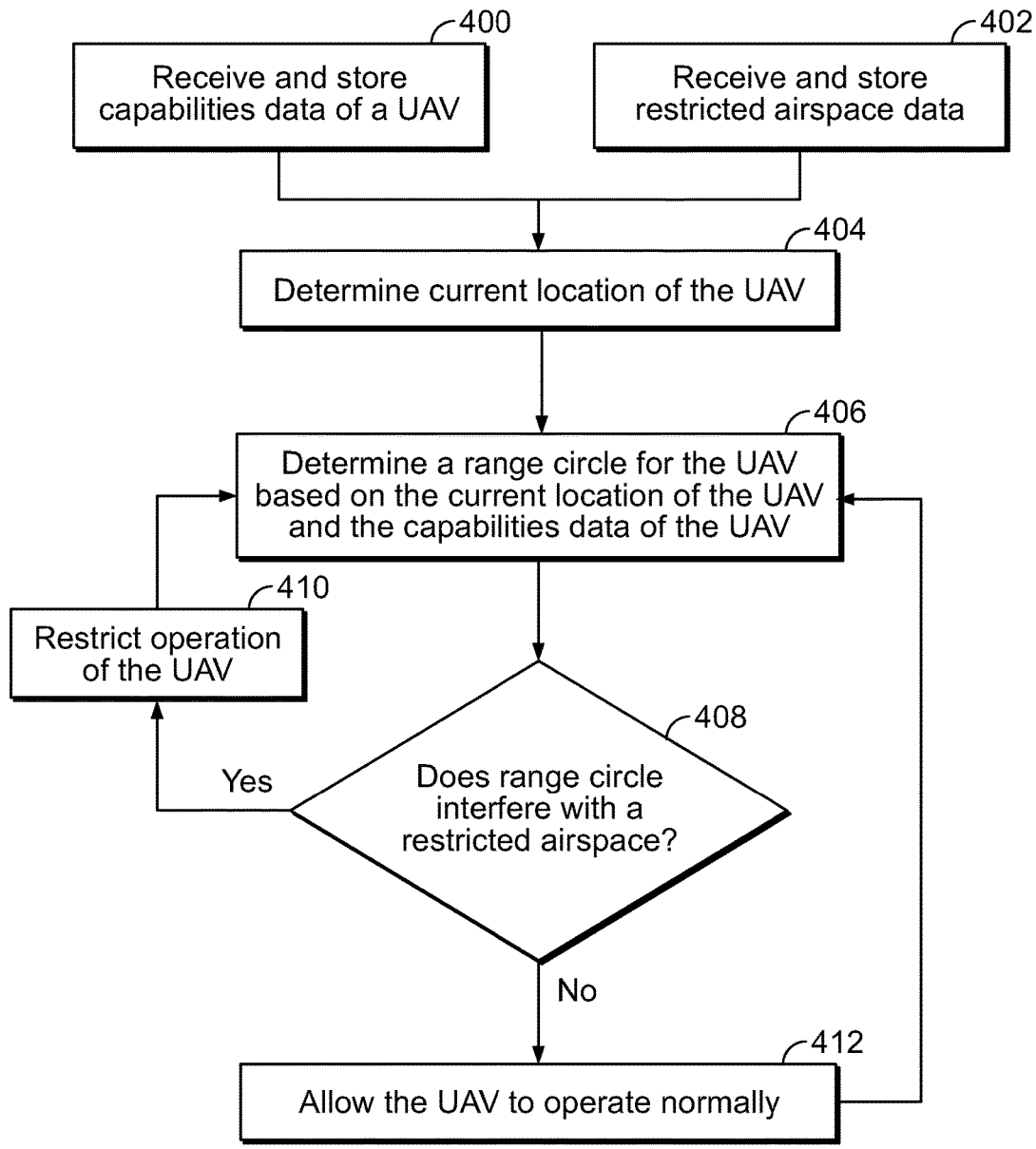
FIG. 8 is a flow chart of a method of controlling operation of a UAV, according to an embodiment of the present disclosure.

FIG. 8 is a flow chart of a method of controlling operation of a UAV, according to an embodiment of the present disclosure. Referring to FIGS. 1 and 8, at 400, the flight range-restricting system 100 receives capabilities data from the UAV 102 and stores the capabilities data in the UAV capabilities storage area 110 of the database 108. At 402, the flight range-restricting system 100 receives restricted airspace data (such as from an aviation authority, a monitoring center, a particular location, and/or the like) and stores the restricted airspace data in the restricted airspace storage area 112 of the database 108. Steps 400 and 402 may overlap in time and/or occur at the same time. Optionally, step 400 may occur prior to step 402, or vice versa.

At 404, the range-restricting control unit 106 determines a current location of the UAV 102. The current location of the UAV 102 may be determined based on a position signal output by a position determination device onboard the UAV 102. In at least one other embodiment, the current location of the UAV 102 may be based on a correlation with a position signal output by a position determination device within a remote UAV control device 104.

At 406, the range-restricting control unit 106 determines a range circle for the UAV 102 based on the current location of the UAV and the capabilities data of the UAV. At 408, the range-restricting control unit 106 determines whether the range circle interferes with a restricted airspace.

If the range circle interferes with the restricted airspace, at 410 the range-restricting control unit 106 restricts operation of the UAV 102. For example, the range-restricting control unit 106 may output a control signal that prevents the UAV 102 from taking off, or that allows the UAV 102 to be operated within a diminished range and/or at diminished capabilities. The method then returns to 406 from 410.

If, however, the range circle does not interfere with the restricted airspace at 408, the method proceeds to 412, in which the range-restricting control unit 106 allows the UAV to operate normally. The method then returns to 406 from 412.

As described above, embodiments of the present disclosure provide systems and methods that restrict operation of consumer-operated UAVs within restricted and regulated airspace. Embodiments of the present disclosure create safe operating environments for consumer-operated UAVs while protecting and enforcing current airspace regulations.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical (or various other angles or orientations), and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flight range-restricting system that is configured to control a flight range of an unmanned aerial vehicle (UAV), the flight range-restricting system comprising:
   a database including a UAV capabilities storage area that stores UAV capabilities data indicative of technical specifications of the UAV, and a restricted airspace storage area that stores restricted airspace data indicative of a restricted airspace; and
   a range-restricting control unit communicatively coupled to the database, wherein the range-restricting control unit controls the flight range of the UAV based on a current location of the UAV, the UAV capabilities data, and the restricted airspace data,
   wherein the range-restricting control unit determines a range circle representative of a range of the UAV, and wherein the range-restricting control unit restricts operation of the UAV when the range circle interferes with the restricted airspace.

2. The flight range-restricting system of claim 1, wherein the range-restricting control unit receives a position signal indicative of the current location of the UAV.

3. The flight range-restricting system of claim 2, wherein the position signal is output by a position determination device onboard the UAV.

4. The flight range-restricting system of claim 2, wherein the position signal is output by a position determination device of a remote UAV control device that controls operation of the UAV.

5. The flight range-restricting system of claim 1, wherein the range-restricting control unit restricts operation of the UAV when the UAV is proximate to or within the restricted airspace.

6. The flight range-restricting system of claim 5, wherein the range-restricting control unit restricts operation of the UAV by preventing the UAV from being flown when the UAV is proximate to or within the restricted airspace.

7. The flight range-restricting system of claim 1, wherein the range circle is centered about a current location of the UAV.

8. The flight range-restricting system of claim 1, wherein the range circle is centered about a current location of a remote UAV control device that controls operation of the UAV.

9. The flight range-restricting system of claim 1, wherein the range-restricting control unit allows for operation of the UAV at a reduced range when the UAV is outside of the restricted airspace and at least a portion of the range circle is within the restricted airspace.

10. A flight range-restricting method that controls a flight range of an unmanned aerial vehicle (UAV), the flight range-restricting method comprising:
    storing capabilities data indicative of technical specifications of the UAV within a UAV capabilities storage area of a database;
    storing restricted airspace data indicative of a restricted airspace within a restricted airspace storage area of the database;
    communicatively coupling a range-restricting control unit to the database;
    analyzing, using a range-restricting control unit, a current location of the UAV, the UAV capabilities data, and the restricted airspace data, wherein the analyzing comprise determining a range circle representative of a range of the UAV, and wherein the controlling comprises restricting operation of the UAV when the range circle interferes with the restricted airspace; and
    controlling, using the range-restricting control unit, the flight range of the UAV based on the analyzing.

11. The flight range-restricting method of claim 10, further comprising receiving, by the range-restricting control unit, a position signal indicative of the current location of the UAV.

12. The flight range-restricting method of claim 11, further comprising outputting the position signal by a position determination device onboard the UAV.

13. The flight range-restricting method of claim 11, further comprising outputting the position signal by a position determination device of a remote UAV control device that controls operation of the UAV.

14. The flight range-restricting method of claim 10, wherein the controlling comprises restricting operation of the UAV when the UAV is proximate to or within the restricted airspace.

15. The flight range-restricting method of claim 14, wherein the restricting comprises preventing the UAV from being flown when the UAV is proximate to or within the restricted airspace.

16. The flight range-restricting method of claim 10, wherein the range circle is centered about a one or both of a current location of the UAV or a current location of a remote UAV control device that controls operation of the UAV.

17. The flight range-restricting method of claim 10, wherein the restricting comprises allowing operation of the UAV at a reduced range when the UAV is outside of the restricted airspace and at least a portion of the range circle is within the restricted airspace.

18. A flight control system, comprising:
    an unmanned aerial vehicle (UAV);
    a remote UAV control device in communication with the UAV, wherein the remote UAV controls operation of the UAV, wherein one or both of the UAV and the remote UAV control device comprises a position determination device that outputs a position signal indicative of a current location of the UAV; and
    a flight range-restricting system that is configured to control a flight range of the UAV, the flight range-restricting system comprising:
        a database including a UAV capabilities storage area that stores UAV capabilities data indicative of technical specifications of the UAV, and a restricted airspace storage area that stores restricted airspace data indicative of a restricted airspace; and a range-restricting control unit communicatively coupled to the database, wherein the range-restricting control unit receives the position signal indicative of the current location of the UAV, and controls the flight range of the UAV based on a current location of the UAV, the UAV capabilities data, and the restricted airspace data, wherein the range-restricting control unit restricts operation of the UAV when the UAV is proximate to or within the restricted airspace, wherein the range-restricting control unit determines a range circle representative of a range of the UAV, and wherein the range-restricting control unit restricts operation of the UAV when the range circle interferes with the restricted airspace.

19. The flight range-restricting system of claim 1, wherein the range circle is based on a current vector of the UAV along with a maximum velocity of the UAV.

20. The flight range-restricting method of claim 10, wherein the range circle is based on a current vector of the UAV along with a maximum velocity of the UAV.

* * * * *